(12) United States Patent
Salas Lumbreras et al.

(10) Patent No.: US 12,010,099 B1
(45) Date of Patent: Jun. 11, 2024

(54) IDENTITY-BASED DISTRIBUTED CLOUD FIREWALL FOR ACCESS AND NETWORK SEGMENTATION

(71) Applicant: UAB 360 IT, Vilnius (LT)

(72) Inventors: Carlos Eliseo Salas Lumbreras, Vilnius (LT); Juta Gurinaviciute, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/378,370

(22) Filed: Oct. 10, 2023

(51) Int. Cl.
   *H04L 9/40* (2022.01)

(52) U.S. Cl.
   CPC ...... *H04L 63/0263* (2013.01); *H04L 63/0272* (2013.01); *H04L 63/08* (2013.01)

(58) Field of Classification Search
   CPC .. H04L 63/0263; H04L 63/08; H04L 63/0272
   USPC ........................................................ 726/11
   See application file for complete search history.

(56) References Cited

U.S. PATENT DOCUMENTS

| | | | |
|---|---|---|---|
| 7,752,662 B2 | 7/2010 | Shulman et al. |
| 8,010,085 B2 | 8/2011 | Apte et al. |
| 8,024,804 B2 | 9/2011 | Shulman et al. |
| 8,413,238 B1 | 4/2013 | Sutton |
| 8,458,786 B1 | 6/2013 | Kailash et al. |
| 8,464,335 B1 | 6/2013 | Sinha et al. |
| 8,484,726 B1 | 7/2013 | Sutton |
| 8,763,071 B2 | 6/2014 | Sinha et al. |
| 9,152,789 B2 | 10/2015 | Natarajan et al. |
| 9,350,710 B2 | 5/2016 | Herle et al. |
| 9,674,202 B1 | 6/2017 | Marget et al. |
| 10,154,067 B2 | 12/2018 | Smith et al. |
| 10,542,029 B2 | 1/2020 | Lapidous |
| 10,803,192 B2 | 10/2020 | Margel et al. |
| 10,834,130 B2 | 11/2020 | Erez et al. |
| 10,911,472 B2 | 2/2021 | Niv et al. |
| 11,003,779 B2 | 5/2021 | Reich et al. |
| 11,159,486 B2 | 10/2021 | Pangeni et al. |
| 11,271,899 B2 | 3/2022 | Bareket et al. |
| 11,277,383 B2 | 3/2022 | Devarajan et al. |
| 11,330,016 B2 | 5/2022 | Arbel et al. |
| 11,368,490 B2 | 6/2022 | Kailash et al. |
| 11,368,496 B2 | 6/2022 | Nahas et al. |
| 11,375,441 B2 | 6/2022 | Nuwula et al. |
| 11,436,358 B2 | 9/2022 | Margel et al. |
| 11,461,484 B2 | 10/2022 | Anand et al. |
| 11,483,291 B2 | 10/2022 | Mantin et al. |
| 11,533,307 B2 | 12/2022 | Mahajan et al. |
| 11,558,184 B2 | 1/2023 | Bareket et al. |

(Continued)

*Primary Examiner* — Benjamin A Kaplan
(74) *Attorney, Agent, or Firm* — Moser Taboada

(57) ABSTRACT

According to some embodiments, a method of controlling access to network resources includes: receiving an authentication request from a user device to a core security service; if the user is authenticated, authorizing the user device to connect to a private cloud, and connecting the user device with the private cloud and retrieving user-specific segmented firewall rules stored in the private cloud; routing, through the firewall rules, a request by the user device to access an outer resource; evaluating the request against the firewall rules; if the request meets the firewall rules, routing the request through security measures of the firewall; and if the request does not meet the firewall rules, denying the user device access to the outer resource.

20 Claims, 4 Drawing Sheets

(56) References Cited

U.S. PATENT DOCUMENTS

| | | |
|---|---|---|
| 11,582,192 B2 | 2/2023 | Devarajan et al. |
| 11,595,385 B2 | 2/2023 | Rozner et al. |
| 11,601,400 B2 | 3/2023 | Yehudai et al. |
| 11,622,313 B1 | 4/2023 | Yadov et al. |
| 11,627,148 B2 | 4/2023 | Desai |
| 2015/0207642 A1* | 7/2015 | Bradbary ............ H04L 12/1822 709/204 |
| 2017/0339165 A1 | 11/2017 | Be'ery et al. |
| 2023/0164117 A1* | 5/2023 | Wu ........................ H04L 63/20 726/1 |

* cited by examiner

IDENTITY-BASED DISTRIBUTED CLOUD FIREWALL FOR ACCESS AND NETWORK SEGMENTATION

FIELD

The present disclosure relates to network firewalls, and more particularly to cloud firewalls.

BACKGROUND

A firewall is a barrier that helps prevent unauthorized network traffic. A firewall monitors incoming and outgoing network traffic and determines whether to allow or block specific traffic based on a defined set of security rules. Thus, a firewall can dynamically block traffic that is deemed to be a security threat and allow traffic deemed safe to pass to its intended destination.

A firewall as a service (FWaaS) is a cloud-based network security solution that provides organizations with firewall capabilities in a cloud environment. FWaaS is designed to provide network security to organizations that are migrating to the cloud or have a distributed workforce.

FWaaS may enable an organization to establish secure local breakouts for applications without investing in security appliances (e.g., hardware and software). Traffic routing options available to FWaaS providers include network address translation (NAT), virtual private network (VPN) connection, and direct network connections. Regardless of the approach chosen, traffic routing is used to ensure that network traffic is properly filtered and secured. Specialized firewall software is used to detect and prevent security threats. By leveraging inspection techniques and configuring security rules and policies, FWaaS providers can monitor and control network traffic to prevent security breaches and protect against a wide range of threats.

FWaaS components may include reporting and analysis capabilities, real-time reporting, and remote management. FWaaS providers may offer reporting and analysis capabilities to generate detailed reports and analyse s of network activity, including real-time and historical reporting. By using remote management the FWaaS provider can remotely manage and update security rules and policies of a firewall, ensuring that the organization's network remains secure against new and evolving threats. By leveraging these capabilities, FWaaS providers can help organizations protect against a wide range of security threats and optimize network performance, all without the need for dedicated IT staff or extensive technical expertise. However, any issues with the FWaaS provider's infrastructure or security can impact an organization's network performance and leave them vulnerable to attacks, which can be a significant concern for organizations that handle sensitive information.

The inventors have observed that some currently available FWaaS technologies may cause decreased network performance and increased latency, potential vulnerability to security or data breaches, and limited ability to customize security rules and policies to meet an organization's specific needs and requirements. What is needed is a FWaaS solution that improves network performance, reduces latency and potential vulnerability to security or data breaches, and offers more flexibility to customize security rules and policies to meet an organization's specific needs and requirements.

SUMMARY

Systems and methods for controlling access to network resources are provided herein. In some embodiments, an apparatus for controlling access to network resources, comprising at least one processor and at least one non-transient computer readable medium for storing instructions that, when executed by the at least one processor, causes the apparatus to perform operations comprising: receiving an authentication request from a user device to a core security service; upon authentication of the user by the core security service, authorizing the user device to connect to a private cloud, and connecting the user device to the private cloud comprising a gateway and a firewall and retrieving user-specific, segmented firewall rules stored in the private cloud; routing a request by the user device to access an outer resource to the gateway; evaluating the request against the segmented firewall rules; if the request meets the segmented firewall rules, routing the request through security measures of the firewall; and if the request does not meet the segmented firewall rules, denying the user device access to the outer resource.

In some embodiments, a method of controlling access to network resources includes: receiving an authentication request from a user device to a core security service; upon authentication of the user by the core security service, authorizing the user device to connect to a private cloud, and connecting the user device to the private cloud comprising a gateway and a firewall and retrieving user-specific, segmented firewall rules stored in the private cloud; routing a request by the user device to access an outer resource to the gateway; evaluating the request against the segmented firewall rules; if the request meets the segmented firewall rules, routing the request through security measures of the firewall; and if the request does not meet the segmented firewall rules, denying the user device access to the outer resource.

In some embodiments, one or more non-transitory computer readable media having instructions stored thereon which, when executed by one or more processors, cause the one or more processors to perform operations comprising: receiving an authentication request from a user device to a core security service; upon authentication of the user by the core security service, authorizing the user device to connect to a private cloud, and connecting the user device to the private cloud comprising a gateway and a firewall and retrieving user-specific, segmented firewall rules stored in the private cloud; routing a request by the user device to access an outer resource to the gateway; evaluating the request against the segmented firewall rules; if the request meets the segmented firewall rules, routing the request through security measures of the firewall; and if the request does not meet the segmented firewall rules, denying the user device access to the outer resource.

Other and further embodiments in accordance with the present principles are described below.

DETAILED DESCRIPTION

According to some embodiments, a FWaaS may be provided and used as a cloud-based network security solution. A FWaaS may be provided that allows for granular access control of network traffic routed through virtual private gateways. This means that administrators can create and store multiple different firewall rules, with the ability to enable and disable a selected number of the firewall rules at any given time. These rules can be configured to either allow or deny traffic based on a variety of factors, including the source of the traffic (which can be any user or a specific group of users or organization (i.e., team)). Other factors may include the destination of the traffic (which can be specified by IP address or subnet) or the services being used to reach that destination (such as specific ports and protocols at OSI layers 3 & 4).

The FWaaS according to some embodiments may allow for the creation of firewall rules for multiple custom destinations and services, which can be centrally managed by administrators. Such firewall rules can be prioritized and processed based on their order of priority. In some embodiments, the firewall rules may be managed (e.g., prioritized) using an administrator interface, such as a GUI drag-and-drop interface or other.

In some embodiments, the FWaaS may work seamlessly with features like Deep Packet Inspection (DPI), Domain Name System (DNS) Filtering, Device Security Posture, ThreatBlock, or others to provide comprehensive protection for a network. Administrators can securely manage the rules, and changes may be logged in an activity log for auditing purposes.

Figure 1:
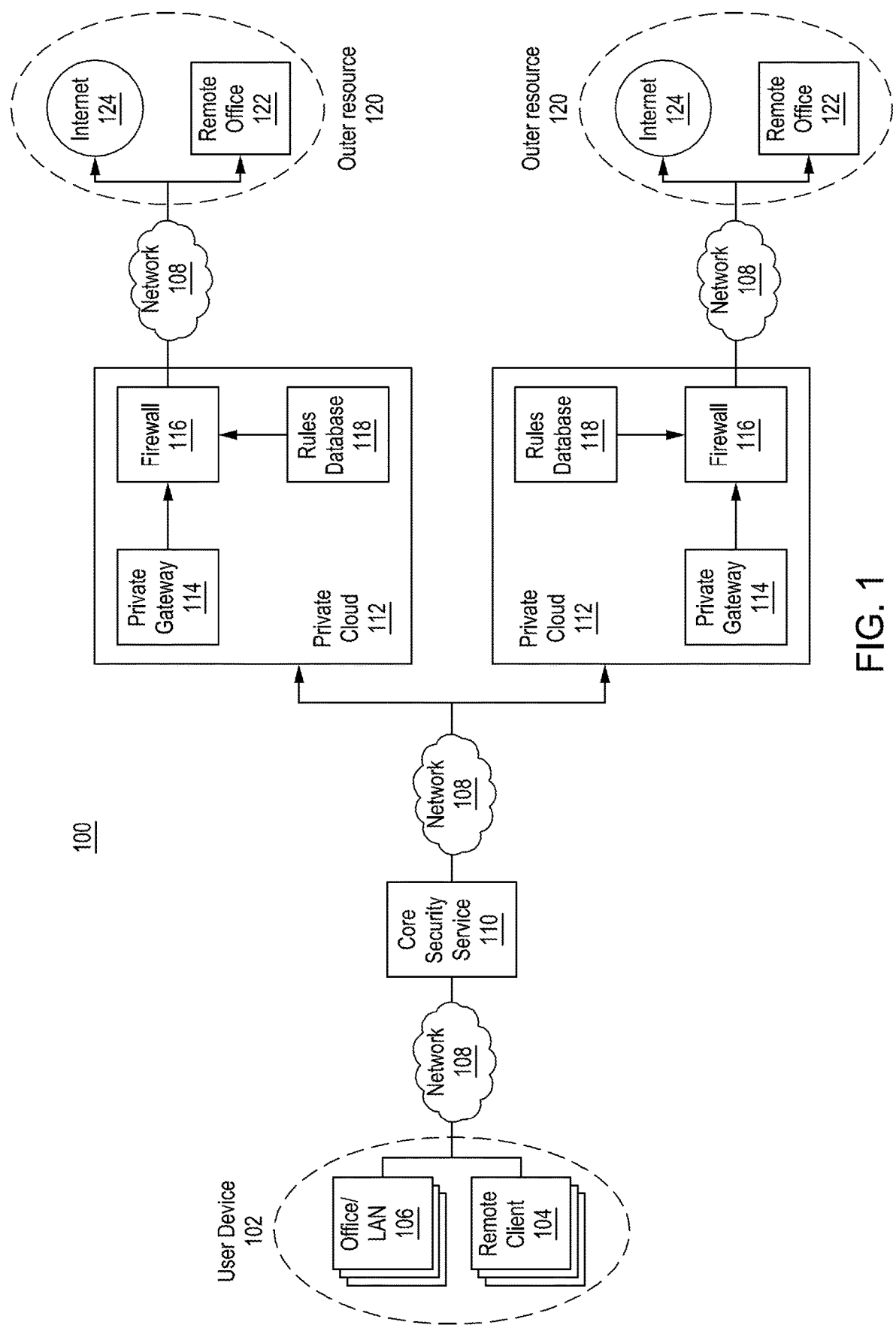
FIG. 1 shows a system architecture implementing a FWaaS in accordance with some embodiments of the present disclosure.

FIG. 1 shows a system architecture of a system 100 for implementing an FWaaS service in accordance with some embodiments of the present disclosure. The system 100 may include at least one user device 102 connected to a network 108, which may include the internet. Each user device 102 may be a remote client 104 or an office/LAN 106. Each user device 102 may be operated by one or more users who are employees of an organization that is a customer of cloud services provided by a cloud service provider. Each user device 102 may be associated with one customer or multiple different customers. In some embodiments, a user of a user device 102 is required to undergo authentication through core security service 110 to establish a connection of the user device 102 to at least one private cloud 112 provided by the cloud service provider. The private cloud 112 may be part of a private cloud infrastructure of the cloud service provider. For example, a private cloud infrastructure may include multiple of virtual servers, which may be used by one customer or multiple different customers (e.g., organizations). The core security service 110 may be separate from the user device 102 and may be provided by the cloud service provider. The core security service 110 may receive authentication and connection requests from multiple users of multiple customers (e.g., organizations). In some embodiments, the core security service 110 may be a cloud service that may be located outside of the at least one private cloud 112. In some embodiments, the connection between the user device 102 and the core security service 110 may use encrypted SSL. In other embodiments, the connection between the user device 102 and the core security service 110 may use encrypted TLS. In yet another embodiment, the connection between the user device 102 and the core security service 110 may use an encrypted VPN tunnel.

In some embodiments, the authentication of the user by the core security service 110 may be used for accessing at least one outer resource 120, which may include the Internet 124 and/or at least one remote office 122. Within the core security service 110, access to the at least one private cloud 112 may be governed by a combination of authentication and access policies defined by a rule set stored in the core security service 110. In some embodiments, the core security service 110 determines which private cloud(s) 112 to connect a user device 102 to. In some embodiments, after user authentication, the core security service 110 may identify the user, and determine at least one of which organization(s) the user belongs to, which private gateway(s) 114 (e.g., servers) the user has permission to access, or which team(s) the user belongs to. In some embodiments, the core security service 110 is unable to authenticate the user if the user cannot be identified or if the user provides incorrect authentication information. In some implementations, at least one private gateway 114 may be a physical or virtual server. In other implementations, at least one private gateway 114 may be a reserved IP address or a range of IP addresses on a virtual or physical server.

Each private cloud 112 may be offered as a cloud service to be used by a customer associated with at least one remote client 104 and/or office/LAN 106. In some embodiments, a customer (e.g., an organization) of a cloud service provider may be provided with at least one private cloud 112, each having at least one private gateway 114 hosted in the private cloud 112 by a service provider. In some embodiments, and as shown in FIG. 1, each private cloud 112 may include at least one private gateway 114, a firewall 116, and a firewall rules database 118. The firewall rules database 118 may store firewall rules that may include sets of firewall rules. The type of firewall rules may be user-specific and segmented in various ways, such as by level of user association, such as individual user, group of user, organization, or even by gateway, rather than based on user network IP address, data source, or data destination. In some embodiments, the database rules for a user may include tiered or hierarchical sets of prioritized rules.

In some embodiments, each private gateway 114 may have a corresponding firewall 116. There may be multiple use cases depending on the use case a customer of cloud services will have. Some customers of the cloud service provider have, for example, the need for a network segmentation. In such an instance, the customer may be provided with multiple private gateways 114 with specific IP addresses for different internal networks. The customer may wish to establish different firewall rules for each internal network. Thus, each private gateway 114 may be paired with a corresponding firewall 116 to enforce the different firewall rules. For example, if a first customer of a cloud service provider has access to multiple (e.g., 2, 3, 4, 10, 20, or any other number) private gateways 114, each gateway 114 may have its own completely segregated firewall 116 provided as a service. Moreover, in the above example, the cloud service provider may have a second customer who has access to multiple (e.g., 2, 3, 4, 10, 20, or any other number) private gateways 114 with firewalls 116 that are completely segregated from the firewalls 116 of the first customer. In comparison to a centralized engine that is performing all firewall functions and filtering, the embodiments of the present disclosure use distributed firewalls alongside all the infrastructure provided within the cloud architecture. In comparison to a centralized firewall engine, the distributed firewalls 116 in accordance with some embodiments of the present disclosure can distribute the firewall load between all the distributed firewalls 116. Also, all processors or rule determination engines that are included in (assigned to) the distributed firewalls 116 may use multiple rule sets that are differentiated between each of the private gateways 114 that a customer (e.g., organization) is provided by a cloud service provider.

In some embodiments, and as shown in FIG. 1, the firewalls 116 are not, practically speaking, steps in the network chain, but may instead be embedded inside of (as a part of) a private gateway 114, which may be a server such as a VPN server that is communicating point A to point B. In some embodiments, the private gateway 114 may be a VPN gateway (e.g., VPN server) that is communicating point-to-point. By locating the private gateway 114 within the private cloud 112, a more streamlined data flow is created. For example, existing data flow may move from point A to a firewall, then to a gateway, and then to a point B, whereas by implementing the architecture of system 100 in accordance with embodiments of the present disclosure, data flow may move between point A, then to a private cloud 112 (with a private gateway 114 and a firewall 116 inside the private cloud) and then to point B. Thus, the architecture of the system 100 described in accordance with embodiments of the present disclosure can help to separate all the firewalls 116 and have multiple central rule sets depending on the private gateway 114 used to connect, which can provide for a more streamlined data flow.

Figure 2:
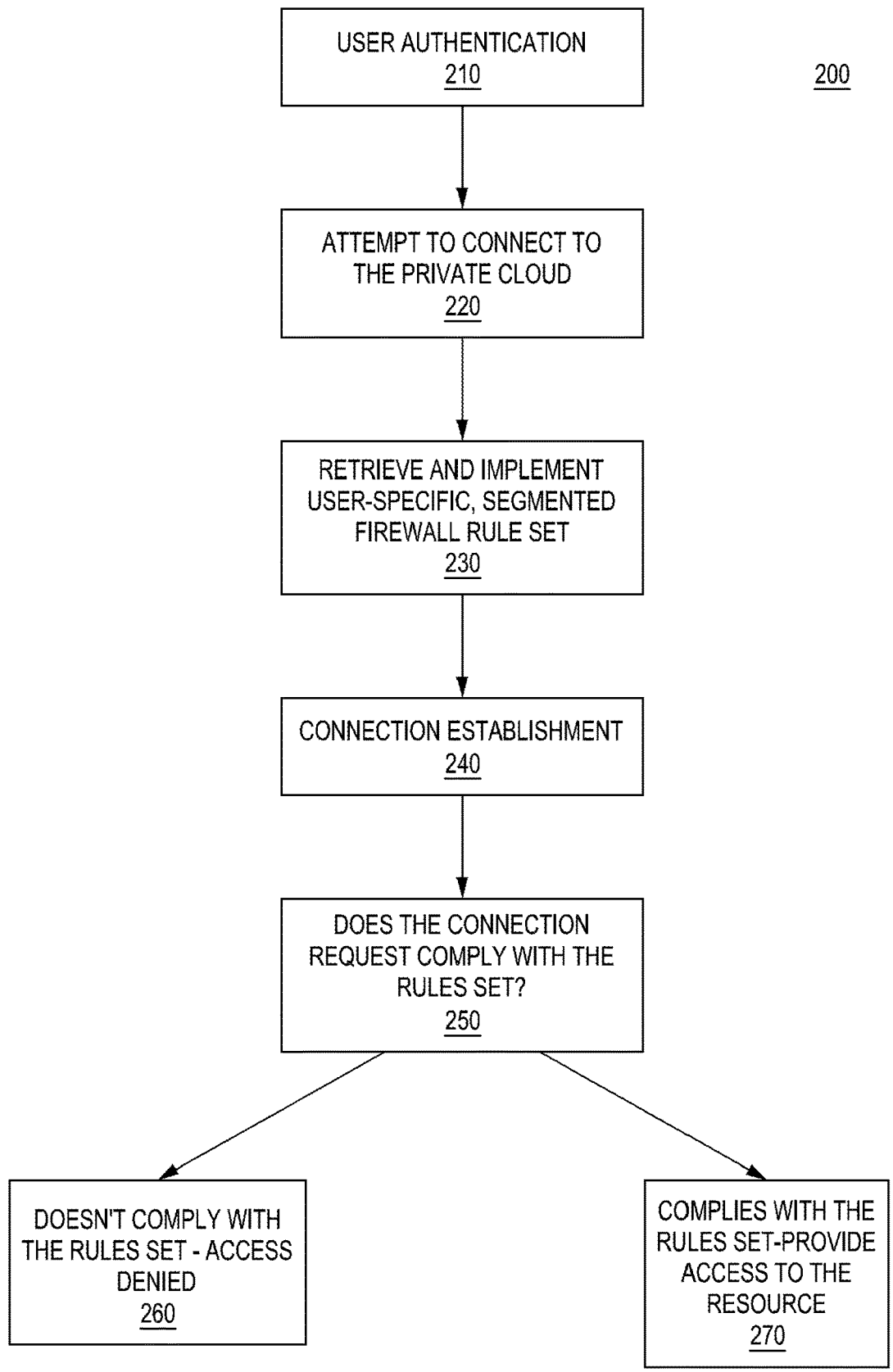
FIG. 2 shows a method for controlling access to network resources in accordance with some embodiments of the present disclosure.

FIG. 2 is a method 200 for controlling access to network resources in accordance with some embodiments of the present disclosure. At block 210, the method 200 may include authenticating a user, i.e., to the core security service 110. The core security service 110 may implement a predetermined authentication policy for authenticating the user. The authentication policy outlines the procedures and types of credentials that users must provide to connect to the at least one outer resource 120. Examples of authentication policies include password-based login, multi-factor authentication, token-based authentication, certificate-based authentication, biometric authentication, and passkey-based authentication. Other forms of authentication policies may also be used.

At block 220, the method 200 may include attempting to connect to the private cloud 112 (e.g., to the private gateway 114 of the private cloud 112). At block 230, the method 200 may include, upon successful authentication of the user, retrieving and implementing segmented firewall rules stored in the at least one firewall rules database 118. At block 240, the method 200 may include achieving a secure connection of the user device 102 to the private cloud 112. Once a connection of the user device 102 to the private cloud 112 is established, all incoming traffic (requests) to the private gateway 114 may be routed through the segmented firewall rule set. Thus, at block 250, the method 200 may include determining whether the connection request complies with the segmented firewall rules set. At block 260, the method 200 may include denying access to the at least one outer resource 120 if the connection request does not comply with the segmented firewall rules set. At block 270, the method 200 may include granting access to the user device 102 to the at least one outer resource 120 if the connection request does comply with the segmented firewall rules set.

Once a user of the user device 102 is successfully authenticated to core security service 110, at least one request to connect the user device 102 to the at least one outer resource 120 is routed through the network 108 to the private cloud(s) 112. The request to connect to outer resource 120 may be transmitted through a secure (i.e., encrypted) VPN tunnel established by the private gateway 114 before being received by the firewall 116. Upon receiving a request, the firewall 116 may retrieve one or more relevant segmented firewall rule sets associated with the user from the firewall rules database 118. If the request adheres to the predefined firewall rules, the request proceeds through the security measures of the firewall 116, which may include an additional security check, such as, but not limited to, Deep Packet Inspection (DPI). Optionally, if the request successfully passes through the firewall 116, the request may be filtered outside the firewall 116 to perform additional security checks using at least one of Domain Name System (DNS) Filtering, Device Security Posture, ThreatBlock, or other applicable measures, which may be implemented modularly outside of the firewall 116. Optionally, in some embodiments, to reduce the burden on the firewall 116, the security checks may be performed before reaching the firewall 116. In some embodiments, optional security checks may occur after the core security service 110 and before and/or after the private cloud 112. Security checks may include at least one of DPI, DNS filtering, ThreatBlock, or other applicable measures. In some embodiments, Deep Packet Inspection may be done within the private cloud 112. The optional security checks may be enabled or disabled by the user or an administrator of the organization using the private cloud 112.

If the request successfully passes through the firewall 116, and passes the optionally enabled additional security checks, the request may be permitted to reach the desired outer resource(s) 120 either through a VPN tunnel (if the outer resource is a remote office or internal network), HTTPS TLS, or through an HTTPS SSL connection (if the outer resource is the internet).

The operation of the firewall 116, firewall rules database 118, and private gateway 114 within the private cloud 112 may be containerized or otherwise segmented to make the operation of the private cloud 212 tailored to the particular customer of the cloud service provider. In some embodiments, one user may be associated with a first set of firewall rules and a second user may be associated with a second set of firewall rules that may be different from the first set of firewall rules. Moreover, in some embodiments, one user may be associated with multiple different sets of firewall rules depending on the private cloud and the private gateway they are connected to. In some embodiments, each customer may designate specific individual users, teams of users, administrators, or organizations that are authorized to define and manage the firewall rules (e.g., sets of firewall rules). In some embodiments, an interface (e.g., a GUI) may be available for authenticated users to manage the firewall rules across multiple firewall rules databases 118 on multiple private clouds 112 belonging to a customer. In some embodiments, one or more defined rules for the first set of firewall rules may be copied/edited/applied to the second set of firewall rules using, for example, a drag and drop interface.

As noted above, in some embodiments, the firewall rules may be segmented by level of user association (e.g., user, group of users, organization, gateway). As one example, an individual user may be associated with a user group (e.g., work project team), an organization (e.g., engineering department), and a private gateway (e.g., engineering server). For each firewall rules database 118, there may be sets of firewall rules for each segmentation (e.g., hierarchical) level. In some cases, conflicts may exist between sets of firewall rules. For example, firewall rules on the individual user level may conflict with more restrictive firewall rules at the user group (e.g., work project team) level.

In some embodiments, the firewall rules have a hierarchy that may be used to resolve conflicts between firewall rules.

For example, firewall rules pertaining to an individual user level may be used to override other conflicting team or organizational level firewall rules. By way of example, if a certain user has very high access privileges, those privileges may conflict with more restrictive firewall rules set for a team to which the certain user belongs or set for a server to which the certain user is connected. In such a case, because the user has very high access privileges, the firewall rules for the user level can override rules set for the team or server. Such an override may be automated or may be done manually by an administrator.

Moreover, there may be situations where multiple conflicting firewall rules are set within one segmentation level (e.g., user, team, organization, or server). Such firewall rules may be ordered in a hierarchy of priority. For example, in the case of an individual user, two conflicting firewall rules may be set, such that the firewall rule having a higher priority will be used by the firewall 116.

Figure 3:
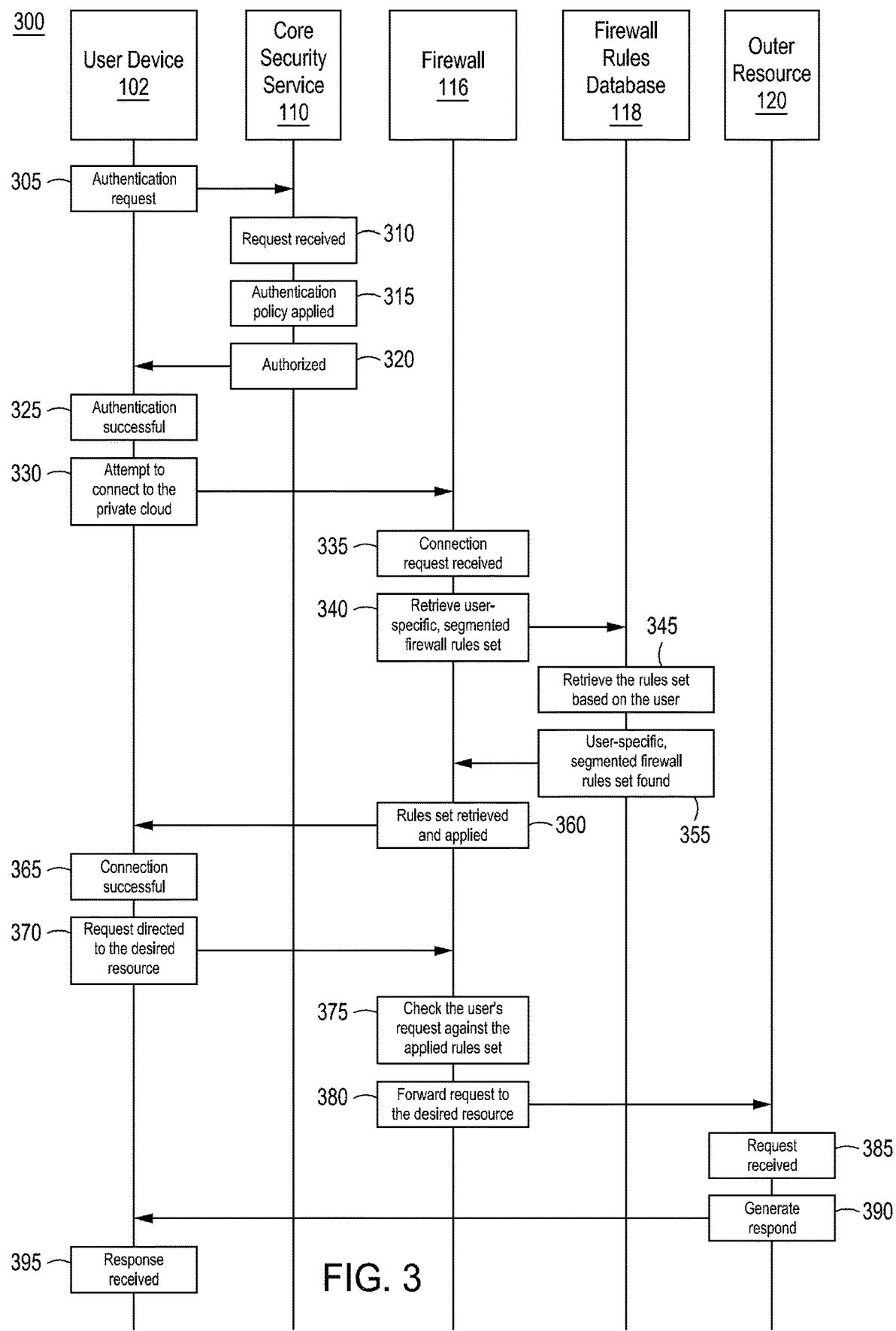
FIG. 3 shows a method for controlling access to network resources in accordance with some embodiments of the present disclosure.

FIG. 3 shows a method 300 for controlling access to network resources in accordance with some embodiments of the present disclosure. In order to facilitate the establishment of a connection between a user device 102 and an outer resource 120, an authentication process may be used as described above. At block 305, the method 300 may begin with a user initiating a request to be authenticated by the core security service 110. At block 310 the user's authentication request is received at the core security service 110. Subsequently, upon receiving the user's authorization request, at block 315, the core security service 110 may apply the authentication policy so that an authorization response is transmitted back to the user device 102 at block 320. Once a successful authentication is confirmed at block 325, the user device 102 may be granted permission to attempt a connection to the private cloud 112 at block 330. At block 330 the user device sends a connection request to the firewall 116. Although not shown in FIG. 3, prior to block 330, a VPN tunnel may be established from the user device 102 to the private cloud 112 associated with the firewall 116.

At block 335, the connection request may be received at the firewall 116. At block 340, upon receiving the connection request, the firewall 116 may retrieve the segmented firewall rules set from the firewall rules database 118. At block 345, the firewall rules set is retrieved from the firewall rules database 118. At block 355, the firewall rules set is sent to the firewall 116 and at block 360 the firewall 116 applies the firewall rule set. With the segmented firewall rules set effectively implemented, the connection to the private cloud 112 is deemed successful at block 365.

Subsequently, at block 370, the user device 102 may send a request for an outer resource 120. At block 375, the firewall 116 may evaluate the request from the user device 102 against the applied segmented firewall rules set at block 375, and, if the request is approved, the request may be forwarded to the outer resource 120 at block 380. At block 385, the outer resource 120 receives the request from the user device 102. At block 390, the outer resource 120 may generate a response that is then transmitted back to the user device 102 at block 390. At block 395, the user device 102 may receive the response from the outer resource 120.

In some embodiments, when the user device 102 disconnects from the private cloud 112, the segmented firewall rules may be removed on the firewall 116 to optimize the resources of the firewall 116.

Figure 4:
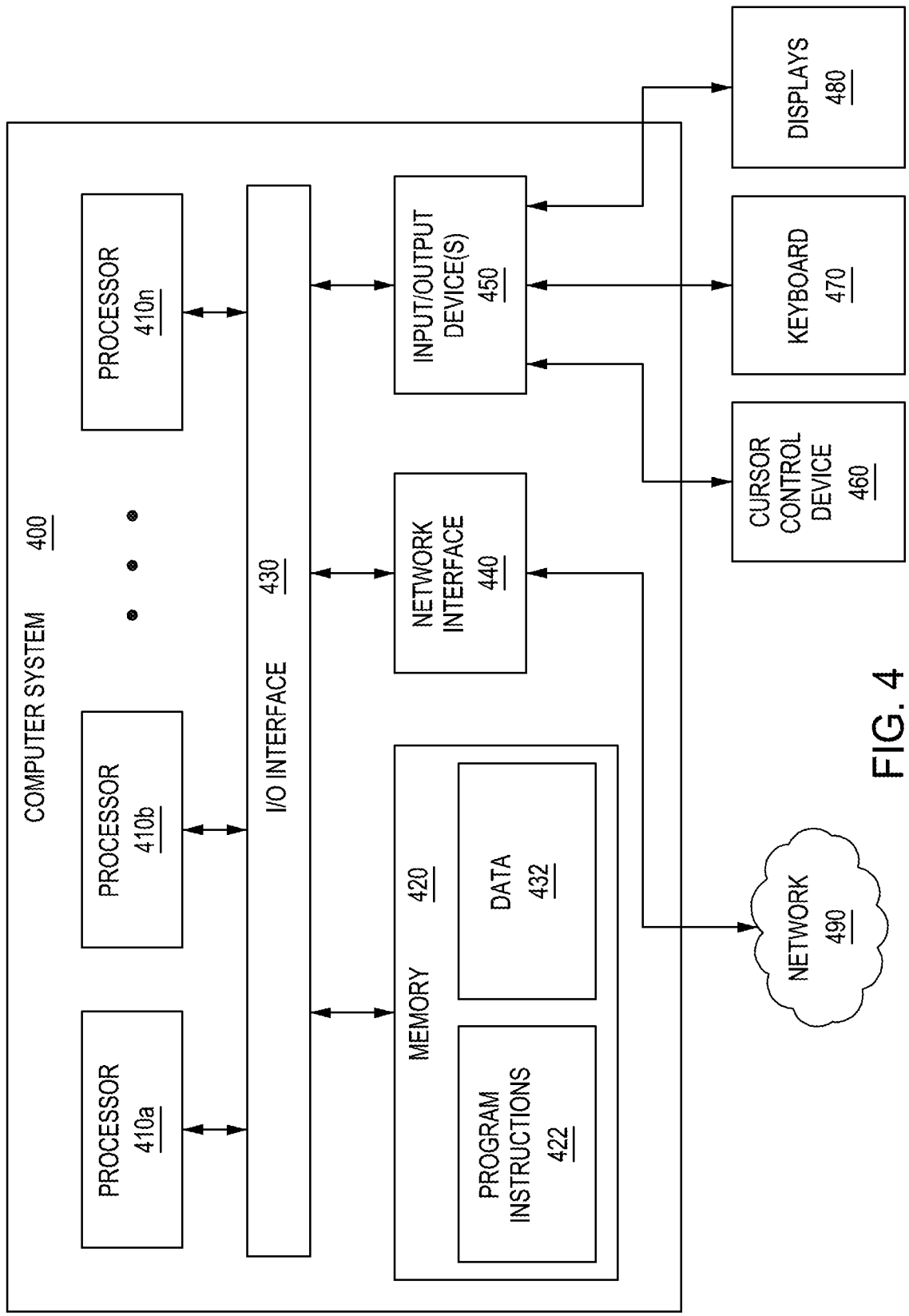
FIG. 4 depicts a high-level block diagram of a computing device in accordance with some embodiments of the present disclosure.

FIG. 4 depicts a computer system 400 that can be utilized in various embodiments of the invention to implement the computer and/or the display, according to one or more embodiments.

Various embodiments of methods and systems, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method of controlling access to network resources, the method comprising:
  receiving an authentication request from a user device to a core security service;
  upon authentication of the user by the core security service, authorizing the user device to connect to a private cloud, and connecting the user device to the private cloud comprising a gateway and a firewall and retrieving user-specific, segmented firewall rules stored in the private cloud;
  routing a request by the user device to access an outer resource to the gateway;
  evaluating the request against the segmented firewall rules;
  if the request meets the segmented firewall rules, routing the request through security measures of the firewall; and
  if the request does not meet the segmented firewall rules, denying the user device access to the outer resource.

B. The method of clause A, wherein each private cloud includes a corresponding firewall.

C. The method of clause A or B, wherein the request is transmitted through a secure VPN tunnel established by the gateway before being received by the firewall.

D. The method of any of clauses A-C, wherein the segmented firewall rules include firewall rules associated with at least one of the user, a group of users, an organization, or the gateway.

E. The method of any of clauses A-D, further comprising forwarding the request to the outer resource and transmitting a response from the outer resource to the user device through the secure VPN tunnel if the request meets the segmented firewall rules and passes the security measures of the firewall.

F. The method of any of clauses A-E, wherein the core security service is located between the user device and at least one of the private cloud.

G. The method of any of clauses A-F, wherein the authentication request includes a request to connect to one or more private clouds associated with the user.

H. An apparatus for controlling access to network resources, comprising at least one processor and at least one non-transient computer readable medium for storing instructions that, when executed by the at least one processor, causes the apparatus to perform operations comprising:
  receiving an authentication request from a user device to a core security service;
  upon authentication of the user by the core security service, authorizing the user device to connect to a private cloud, and connecting the user device to the private cloud comprising a gateway and a firewall and retrieving user-specific, segmented firewall rules stored in the private cloud;
  routing a request by the user device to access an outer resource to the gateway;
  evaluating the request against the segmented firewall rules;
  if the request meets the segmented firewall rules, routing the request through security measures of the firewall; and
  if the request does not meet the segmented firewall rules, denying the user device access to the outer resource.

I. The apparatus of clause H, wherein each private cloud includes a corresponding firewall.

J. The apparatus of clause H or I, wherein the request is transmitted through a secure VPN tunnel established by the gateway before being received by the firewall.

K. The apparatus of any of clauses H-J, wherein the segmented firewall rules include firewall rules associated with at least one of the user, a group of users, an organization, or the gateway.

L. The apparatus of any of clauses H-K, further comprising forwarding the request to the outer resource and transmitting a response from the outer resource to the user device through the secure VPN tunnel if the request meets the segmented firewall rules and passes the security measures of the firewall.

M. The apparatus of any of clauses H-L, wherein the core security service is located between the user device and the private cloud.

N. The apparatus of any of clauses H-M, wherein the authentication request includes a request to connect to one or more private clouds associated with the user.

O. One or more non-transitory computer readable media having instructions stored thereon which, when executed by one or more processors, cause the one or more processors to perform operations comprising:
- receiving an authentication request from a user device to a core security service;
- upon authentication of the user by the core security service, authorizing the user to connect to a private cloud, and connecting the user to the private cloud comprising a gateway and a firewall and retrieving user-specific, segmented firewall rules stored in the private cloud;
- routing a request by the user device to access an outer resource to the gateway;
- evaluating the request against the segmented firewall rules;
- if the request meets the segmented firewall rules, routing the request through security measures of the firewall; and
- if the request does not meet the segmented firewall rules, denying the user device access to the outer resource.

P. The computer readable media of clause O, wherein each private cloud includes a corresponding firewall.

Q. The computer readable media of clause O or P, wherein the request is transmitted through a secure VPN tunnel established by the gateway before being received by the firewall.

R. The computer readable media of any of clauses O-Q, wherein the segmented firewall rules include firewall rules associated with at least one of the user, a group of users, an organization, or the gateway.

S. The computer readable media of any of clauses O-R, forwarding the request to the outer resource and transmitting a response from the outer resource to the user device through the secure VPN tunnel if the request meets the segmented firewall rules and passes the security measures of the firewall.

T. The computer readable media of any of clauses O-S, wherein the authentication request includes a request to connect to one or more private clouds associated with the user.

The invention claimed is:

1. A method of controlling access to network resources, the method comprising:
- receiving an authentication request from a user device to a core security service;
- upon authentication of the user device by the core security service, authorizing the user device to connect to a private cloud, and connecting the user device to the private cloud comprising a gateway and a firewall and retrieving user-specific, segmented firewall rules stored in the private cloud;
- routing a request by the user device to access an outer resource to the gateway;
- evaluating the request against the segmented firewall rules;
- if the request meets the segmented firewall rules, routing the request through security measures of the firewall; and
- if the request does not meet the segmented firewall rules, denying the user device access to the outer resource.

2. The method of claim 1, wherein each private cloud includes a corresponding firewall.

3. The method of claim 2, wherein the request is transmitted through a secure VPN tunnel established by the gateway before being received by the firewall.

4. The method of claim 3, wherein the segmented firewall rules include firewall rules associated with at least one of the user, a group of users, an organization, or the gateway.

5. The method of claim 3, further comprising forwarding the request to the outer resource and transmitting a response from the outer resource to the user device through the secure VPN tunnel if the request meets the segmented firewall rules and passes the security measures of the firewall.

6. The method of claim 1, wherein the core security service is located between the user device and at least one of the private cloud.

7. The method of claim 1, wherein the authentication request includes a request to connect to one or more private clouds associated with the user.

8. An apparatus for controlling access to network resources, comprising at least one processor and at least one non-transient computer readable medium for storing instructions that, when executed by the at least one processor, causes the apparatus to perform operations comprising:
- receiving an authentication request from a user device to a core security service;
- upon authentication of the user by the core security service, authorizing the user device to connect to a private cloud, and connecting the user device to the private cloud comprising a gateway and a firewall and retrieving user-specific, segmented firewall rules stored in the private cloud;
- routing a request by the user device to access an outer resource to the gateway;
- evaluating the request against the segmented firewall rules;
- if the request meets the segmented firewall rules, routing the request through security measures of the firewall; and
- if the request does not meet the segmented firewall rules, denying the user device access to the outer resource.

9. The apparatus of claim 8, wherein each private cloud includes a corresponding firewall.

10. The apparatus of claim 9, wherein the request is transmitted through a secure VPN tunnel established by the gateway before being received by the firewall.

11. The apparatus of claim 10, wherein the segmented firewall rules include firewall rules associated with at least one of the user, a group of users, an organization, or the gateway.

12. The apparatus of claim 10, further comprising forwarding the request to the outer resource and transmitting a response from the outer resource to the user device through the secure VPN tunnel if the request meets the segmented firewall rules and passes the security measures of the firewall.

13. The apparatus of claim 8, wherein the core security service is located between the user device and the private cloud.

14. The apparatus of claim 8, wherein the authentication request includes a request to connect to one or more private clouds associated with the user.

15. One or more non-transitory computer readable media having instructions stored thereon which, when executed by one or more processors, cause the one or more processors to perform operations comprising:

receiving an authentication request from a user device to a core security service;

upon authentication of the user by the core security service authorizing the user device to connect to a private cloud, and connecting the user device to the private cloud comprising a gateway and a firewall and retrieving user-specific, segmented firewall rules stored in the private cloud;

routing a request by the user device to access an outer resource to the gateway;

evaluating the request against the segmented firewall rules;

if the request meets the segmented firewall rules, routing the request through security measures of the firewall; and if the request does not meet the segmented firewall rules, denying the user device access to the outer resource.

16. The computer readable media of claim 15, wherein each private cloud includes a corresponding firewall.

17. The computer readable media of claim 16, wherein the request is transmitted through a secure VPN tunnel established by the gateway before being received by the firewall.

18. The computer readable media of claim 17, wherein the segmented firewall rules include firewall rules associated with at least one of the user, a group of users, an organization, or the gateway.

19. The computer readable media of claim 17, forwarding the request to the outer resource and transmitting a response from the outer resource to the user device through the secure VPN tunnel if the request meets the segmented firewall rules and passes the security measures of the firewall.

20. The computer readable media of claim 15, wherein the authentication request includes a request to connect to one or more private clouds associated with the user.

* * * * *